(12) United States Patent
Ohta et al.

(10) Patent No.: US 7,568,159 B2
(45) Date of Patent: Jul. 28, 2009

(54) APPARATUS CONTROL METHOD AND SYSTEM

(75) Inventors: Akihiro Ohta, Tokyo (JP); Yasunori Nagatomo, Tokyo (JP)

(73) Assignee: Sony Corporation, Tokyo (JP)

( * ) Notice: Subject to any disclaimer, the term of this patent is extended or adjusted under 35 U.S.C. 154(b) by 648 days.

(21) Appl. No.: 10/149,870

(22) PCT Filed: Oct. 16, 2001

(86) PCT No.: PCT/JP01/09079

§ 371 (c)(1),
(2), (4) Date: Oct. 9, 2002

(87) PCT Pub. No.: WO02/33559

PCT Pub. Date: Apr. 25, 2002

(65) Prior Publication Data

US 2003/0093469 A1    May 15, 2003

(30) Foreign Application Priority Data

Oct. 16, 2000    (JP) ............................. 2000-315831

(51) Int. Cl.
*G06F 3/00* (2006.01)
(52) U.S. Cl. ..................................... 715/748
(58) Field of Classification Search .................. 715/748
See application file for complete search history.

(56) References Cited

U.S. PATENT DOCUMENTS

| | | | |
|---|---|---|---|
| 4,070,710 A | | 1/1978 | Sukonick et al. |
| 5,010,401 A | * | 4/1991 | Murakami et al. ..... 375/240.16 |
| 5,283,864 A | * | 2/1994 | Knowlton ............. 715/776 |
| 5,426,445 A | * | 6/1995 | Prouty et al. ............ 345/28 |
| 5,430,458 A | * | 7/1995 | Weber ................. 345/60 |

(Continued)

FOREIGN PATENT DOCUMENTS

| | | |
|---|---|---|
| EP | 0 312 720 | 4/1989 |
| EP | 0 965 908 | 12/1999 |
| JP | 2000-10747 | 1/2000 |
| JP | 2000-259536 | 9/2000 |

OTHER PUBLICATIONS

"Advanced HTML FAQ", [online], Netscape Communications Corporation, Jul. 4, 1997, [ retrieved on Dec. 18, 2001], retrieved from the Internet <URL: http://developer.netscape.com/support/faqs/advhtml/advhtml.html>, see: "is there a way to submit a form and ignore the response?".

*Primary Examiner*—Stephen Hong
*Assistant Examiner*—Ryan F Pitaro
(74) *Attorney, Agent, or Firm*—Frommer Lawrence & Haug LLP; William S. Frommer; Paul A. Levy

(57) ABSTRACT

The present invention provides a method and system for solving the problem that re-drawing of a screen is instantaneously switched to and makes the screen hard to view when repeating the same operation or the like in the case of remote control of an apparatus using a browser, a server installed in a household electrical appliance or other apparatus, and applications thereof. The method and system of the present invention (1) have the server prepare by a frame structure a higher page forming a burial origin for a page of a desired layout on the display screen of the browser programmed by HTML, (2) have the server set a dummy frame page of a region zero not containing content in the prepared frame, (3) have the server set a desired page to be displayed in a remaining region, (4) have the server set the frame lines not to be displayed, (5) have the server set a response frame for a request from the browser in the dummy frame, and (6) have the browser display processing results from the server and not appear to update the inside of the desired frame of the browser screen for any response.

6 Claims, 14 Drawing Sheets

U.S. PATENT DOCUMENTS

| | | | |
|---|---|---|---|
| 5,757,364 A * | 5/1998 | Ozawa et al. | 345/539 |
| 5,822,599 A * | 10/1998 | Kidder et al. | 713/324 |
| 5,854,628 A * | 12/1998 | Nakagawa | 715/803 |
| 6,008,836 A * | 12/1999 | Bruck et al. | 725/131 |
| 6,523,022 B1 * | 2/2003 | Hobbs | 707/3 |
| 6,678,834 B1 * | 1/2004 | Aihara et al. | 713/501 |
| 6,720,982 B1 * | 4/2004 | Sakaguchi | 715/768 |
| 6,734,873 B1 * | 5/2004 | Herf et al. | 345/629 |
| 6,735,616 B1 * | 5/2004 | Thompson et al. | 709/204 |
| 7,020,845 B1 * | 3/2006 | Gottfurcht et al. | 715/853 |
| 7,106,275 B2 * | 9/2006 | Brunner et al. | 345/32 |
| 7,324,072 B1 * | 1/2008 | Canova et al. | 345/55 |
| 2002/0093516 A1 * | 7/2002 | Brunner et al. | 345/629 |
| 2008/0012872 A1 * | 1/2008 | Flickinger et al. | 345/581 |
| 2008/0018582 A1 * | 1/2008 | Yang et al. | 345/98 |

* cited by examiner

FIG.9

```
<html>
<head>
 MIDDLE OMITTED
</head>
<BODY>
MIDDLE OMITTED (STICK IMAGES TO POSITIONS)

CLICK A PORTION (CALL UP ISAPI APPLICATION WITH A AS ARGUMENT)
 CLICK B PORTION (CALL UP ISAPI APPLICATION WITH B AS ARGUMENT)
                              •
                              •
                              •
  CLICK F PORTION (CALL UP ISAPI APPLICATION WITH F AS ARGUMENT)

</BODY>
</html>
```

(ESTABLISHED BY ONE FILE)

FIG. 14
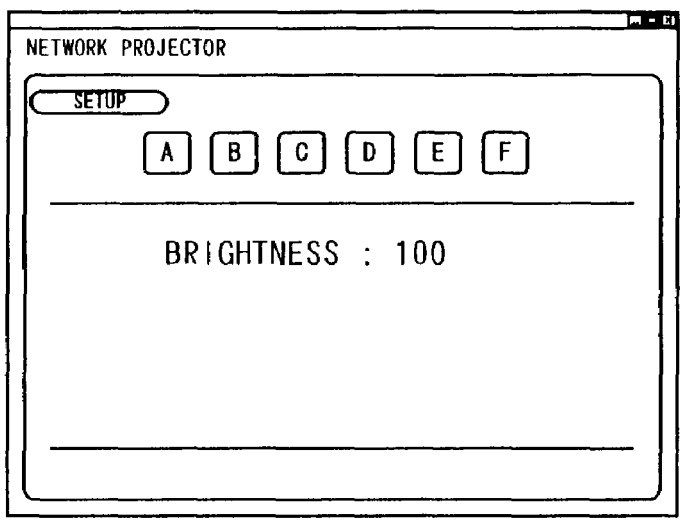
DIVIDE TO FIVE PARTS
SO AS TO SURROUND
CHANGING PORTION
top.htm
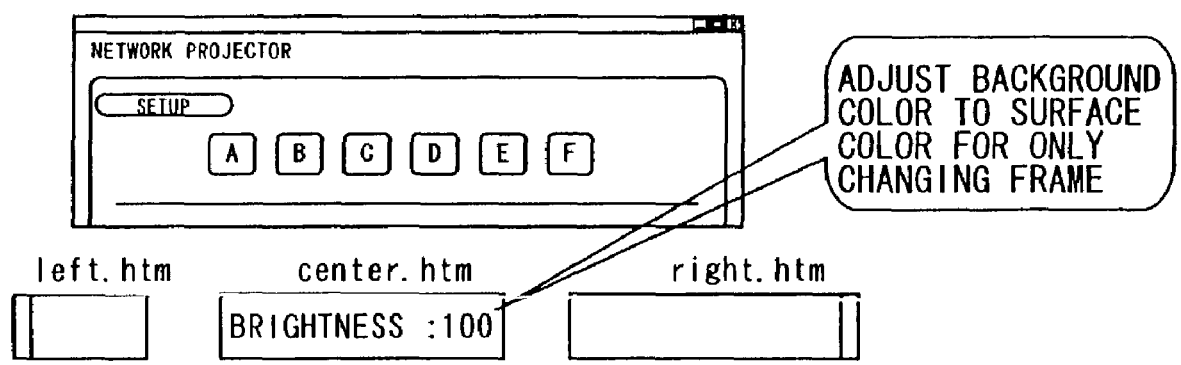
ADJUST BACKGROUND
COLOR TO SURFACE
COLOR FOR ONLY
CHANGING FRAME
left.htm   center.htm   right.htm
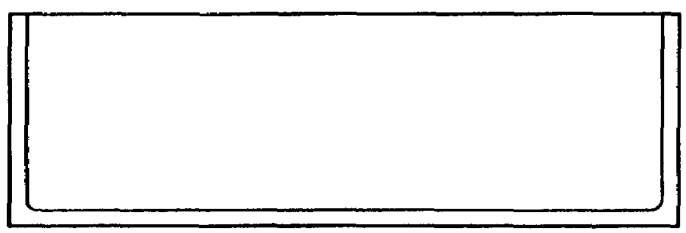
bottom.htm

APPARATUS CONTROL METHOD AND SYSTEM

TECHNICAL FIELD

The present invention relates to a method and system for remote control of an apparatus via a network (communication network).

More specifically, the present invention relates to a method and system for controlling the operation of an apparatus, for example, a case of controlling the operation of a projector having a home server function by a client personal computer serving as a browser.

BACKGROUND ART

Below, a summary of the related art and background art relating to the present invention will be explained.

An example of the communication method will be explained illustrating the Internet as an example of a network (communication network).

WWW Service

The WWW (World Wide Web), as is well known, is one of the information services of the Internet. Namely, the WWW service is established by transmitting information written by a language such as HTML (HyperText Markup Language) using a client/server type protocol (communication agreement) referred to as HTTP (HyperText Transfer Protocol) between a client usually using a personal computer (PC), that is, a Web browser, and a server.

The Web browser carried in the client PC has as its main role to access a URL (Uniform Resource Locator) designated by a user and display the information. As Web browsers, Microsoft's Internet Explorer and Netscape Communications' Netscape Navigator are famous.

When obtaining information from a server using a Web browser, text files having file extensions such as ".html" or ".htm" are sent from the server to the Web browser. These files are written in the HTML language and are document files of a type referred to as HyperText documents.

"HyperText" means a mechanism burying link information to another document in a certain character string in a document freely prepared by the user and enabling other information to be referred to by selecting that character string.

In WWW, by utilizing this HyperText mechanism, the information can be freely comprised by freely extending the link from a local resource of the server to a resource on the network.

Extensions are continuously being added to the specifications of HTML at present. Image, audio, and other data are also now being handled.

CGI, ISAPI

CGI (Common Gateway Interface) means the specification (interface) for extending a function by an API (Application Programming Interface) connecting a Web server and another program operating on the server.

An application using CGI is prepared by a C language, Perl language (type of script language), etc. and operates to return some sort of answer with respect to a value transferred from the browser in cooperation with an application operating on the server.

On the other hand, ISAPI (Internet Server Application Programming Interface) operates to return some sort of answer with respect to information transferred from the browser in the same way as a DLL (Dynamic Link Library). ISAPI takes the form of a DLL operating in a process space of a server.

Both CGI and ISAPI are applications appearing to operate on a server. By using CGI and ISAPI, a Web server having only the function of displaying HTML pages prepared in advance can be given more diverse functions.

Communication Between Web Browser and Web Server

FIG. 1 is a view illustrating the flow of processing when accessing a Web page placed inside a server and programmed by only HTML from a browser of a client personal computer (PC).

In FIG. 1, when the browser sends a request to the Web server, the Web server reads the requested file and sends back a response to the browser of the client PC. In this case, it is also possible for the browser to inquire about an IP address of a target Web server corresponding to the URL designated with respect to the DNS server via the Internet and send the request to the Web server by using the found IP address.

FIG. 2 is a view illustrating the flow of the processing in the case of accessing a Web page containing a CGI or ISAPI application.

When information from the client PC is necessary, it is also possible to explicitly send the information to the server from an area described by a tag referred to as a "form" programmed by HTML. The Web server starts up the application of ISAPI or CGI and performs the processing by the server application according to the data transferred from the client browser (client PC).

The Web server sends back the processed result again to the client browser as a response.

Recent Use of Method of Using Browser

Recently, a Web server does not only extract information existing in the server. It is also possible to send information of a client PC to the Web server, process that information by ISAPI or CGI, and return it to the client PC. Due to this, the relationship between browsers and Web servers, which has been utilized as an information network called the Internet hitherto, is now being applied to other areas too.

As an example of this, there may be mentioned a remote control system and method for remote control of an apparatus such as a household electrical appliance.

A Web server function explained by illustration in FIG. 1 and FIG. 2 is incorporated in an apparatus to be remote controlled and connected to a network, for example, the Internet.

As opposed to this, the browser on the client side corresponding to a remote controller such as a TV receiver remote controller and air conditioner remote controller sends a command corresponding to a command of the remote controller to the apparatus (Web server) via the network.

Then, according to the content of the arrived command, the Web server can perform an operation just like if it were operated by a remote controller in place of a command which can be understood for the inside of the apparatus by a server application (ISAPI, CGI).

FIG. 3 is a view of an outline of a remote control system in the case of using a projector as an apparatus controlled by a remote controller explained above.

FIG. 3 illustrates a configuration for remote control of a projector 1 using a remote controller RC having a browser function. The projector 1 has the function of a Web browser. In FIG. 3, the Internet is not used as the network. A infrared ray is propagated through the space between the remote controller RC and projector 1.

Recent projectors have personal computers built in the projectors per se and have liquid crystal display devices, polarizing means, etc. built in. They can directly receive video information from the personal computers, process that information, project images in colors. Therefore, it is easy to install servers in personal computers mounted in such projectors.

When controlling the projector proper by the remote controller RC in such a remote controlled system, the remote controller RC is operated within a range where infrared rays of the remote controller RC can reach and facing the projector proper. Then, the projector having the function of a server performs processing for control according to the instructions of the remote controller. The projector performs processing in accordance with the results.

FIG. 4 is a view of the configuration wherein a projector 12 and a client PC (browser) 11 are connected via a network 15.

The client PC 11 carries the browser function, while the projector 12 carries the Web server function.

The projector 12 also has built into it, other than the personal computer having the function of a Web server, a liquid crystal display, polarizing means, etc. It is configured to be able to project images in color by using the personal computer of the server or using a built-in second personal computer for video display or image processing apparatus to directly receive and process video information from a personal computer outside of the projector 12.

FIG. 5 is a flow chart of the processing of a server in the projector 12 in FIG. 4.

Step 1, 2: A screen of a remote controller RC showing a list of commands is first formed on the Web in advance. The URL of that screen is designated from the browser (client PC) 11 by using a network line 15.

Step 3: The server carried in the projector 12 returns the screen information showing the list of commands to the browser (client PC) 11. Thereafter, by selecting a command corresponding to the desired remote control operation from the list at the browser 11, the command information is transferred to the server.

Step 4: The server in the projector 12 controls the apparatus in place of commands inside the apparatus by the server application (CGI, ADAPI) based on that information.

Step 5: The server in the projector 12 sends back a response of the end of operation to the browser (client PC) 11 which sent the request.

Step 6: The client browser 11 receives that response and replies in accordance with that content. The method of reply is to make another request, terminate the operation, etc.

Step 7: So long as there is a request from the client browser 11, the above processing is repeated.

However, the following problem is encountered when a client browser is used as a controller in the configuration and method explained above. Namely, when controlling an apparatus by using the browser of the client, the server installed in the apparatus to be controlled, and the application thereof, the problem arises that the screen is instantaneously switched for redrawing when the same operation is repeated or the like and the screen becomes hard to view. Details will be explained below.

In general, when employing a usage method like a remote control operation, a usage method continuing the same command is frequently used.

If it is desired to realize this by the method of issuing a request to the server installed in the apparatus under the control of the browser, in the HTTP protocol, one response is always returned for one command (request). The browser to which the response is returned re-draws the browser screen in accordance with the content of the response. This being so, when the same command is continuously sent, the screen will be continuously re-drawn. At this time, a phenomenon of the screen switching many times in a short time arises, so a situation like a blinking (flashing) screen is exhibited. Such a phenomenon becomes a visually obstacle and results in poor response of the control operation and poor operability overall.

In the above example, the explanation was given taking as an example a projector as the apparatus, but a problem similar to the above is encountered in the case of remote control of various other types of apparatuses as well. That is, the apparatus to be controlled is not limited to a projector. All apparatuses connected to for example a network can be covered as the network. That is, a similar problem to the above is also encountered in the case where a home server or the like is installed in the apparatus.

DISCLOSURE OF THE INVENTION

An object of the present invention is to provide a method and system for control of an apparatus which is free from visual obstruction due to a response being returned from the server even when performing the above operation, free from a reduction in the response of the control operability, and enabling the operation to be accurately executed.

According to a first aspect of the present invention, there is provided a method for control of an apparatus which controls the operation of an apparatus based on a request from a browser and/or responds to the browser from a server relating to the state of the apparatus through a network using a predetermined communication protocol, the method for control of an apparatus including having the server prepare by a frame structure a higher page forming a burial origin for a page of a desired layout to be displayed by the above browser programmed by a programming language of a Web page, having the server set a dummy frame of a region zero not containing content in the prepared frame, having the server set a desired page having a means for controlling the apparatus and/or making a request relating to the state of the apparatus to be displayed in a remaining region other than the dummy frame, having the server set a response frame for responding to a request from the browser and updating the frame in the dummy frame, and having the browser display processing results based on a response from the server to a request from the browser according to the setting in the server and not appear to update the inside of the frame.

According to a second aspect of the present invention, there is provided a system for control of an apparatus comprising a server which controls the operation of an apparatus based on a request from a browser and/or responds to the browser from a server relating to the state of the apparatus through a network using a predetermined communication protocol, the system for control of an apparatus comprising having the server prepare by a frame structure a higher page forming a burial origin for a page of a desired layout to be displayed by the above browser programmed by a programming language of a Web page, having the server set a dummy frame of a region zero not containing content in the prepared frame, having the server set a desired page having a means for controlling the apparatus and/or making a request relating to the state of the apparatus to be displayed in a remaining region other than the dummy frame, having the server set a response frame for responding to a request from the browser and updating the frame in the dummy frame, and having the browser display processing results based on a response from the server to a request from the browser according to the setting in the server and not appear to update the inside of the frame.

According to a third aspect of the present invention, there is provided an electronic apparatus provided with a server which responds to the browser based on a request from a browser through a network using a predetermined protocol and a control means for controlling the inside based on a command generated in the server by a request from the browser, the electronic apparatus characterized in that the server prepares by a frame structure a higher page forming a burial origin for a page of a desired layout to be displayed by the above browser programmed by a programming language of a Web page, the server sets a dummy frame of a region zero not containing content in the prepared frame, the server sets a desired page having a means for making a request for control of the inside to be displayed in a remaining region other than the dummy frame, the server sets a response frame for responding to a request from the browser and updating the frame in the dummy frame, and the browser displays processing results based on a response from the server to a request from the browser according to the setting in the server and does not appear to update the inside of the frame.

According to a fourth aspect of the present invention, there is provided a method for control of an apparatus which controls the operation of an apparatus based on a request from a browser and/or responds to the browser from a server relating to the state of the apparatus through a network using a predetermined communication protocol, the method for control of an apparatus comprising having the server divide by a frame structure a higher page forming a burial origin for a page of a desired layout to be displayed by the above browser programmed by a programming language of a Web page so as to surround only a variable page requiring a change of the content of the display based on a response to the server, having the server set a background color of the variable page to be standardized with the surface color, having the server set a response frame for responding to a request from the browser and updating the frame in the variable frame, and having the browser display processing results based on a response from the server according to the setting in the server and thereby change only the frame including the variable page in the frame and not change other frames.

According to a fifth aspect of the present invention, there is provided a system for control of an apparatus comprised of a server which controls the operation of an apparatus based on a request from a browser and/or responds to the browser from a server relating to the state of the apparatus through a network using a predetermined communication protocol, the system for control of an apparatus including having the server divide by a frame structure a higher page forming a burial origin for a page of a desired layout to be displayed by the above browser programmed by a programming language of a Web page so as to surround only a variable page requiring a change of the content of the display based on a response to the server, having the server set a background color of the variable page to be standardized with the surface color, having the server set a response frame for responding to a request from the browser and updating the frame in the variable frame, and having the browser display processing results based on a response from the server according to the setting in the server and thereby change only the frame including the variable page in the frame and not change other frames.

According to a sixth aspect of the present invention, there is provided an electronic apparatus provided with a server which responds to the browser based on a request from a browser through a network using a predetermined communication protocol and control means for controlling the inside based on a command produced in the server due to a request from the browser, the electronic apparatus characterized in that the server divides by a frame structure a higher page forming a burial origin for a page of a desired layout to be displayed by the above browser programmed by a programming language of a Web page so as to surround only a variable page requiring a change of the content of the display based on a response to the server, the server sets a background color of the variable page to be standardized with the surface color, the server sets a response frame for responding to a request from the browser and updating the frame in the variable frame, and the browser displays processing results based on a response from the server according to the setting in the server and thereby changes only the frame including the variable page in the frame and not change other frames.

According to a seventh aspect of the present invention, there is provided a method for control of an apparatus which controls an apparatus using a server which controls the operation of an apparatus based on an instruction from a browser displayed on a display screen and/or reports to the browser relating to the state of the apparatus through a network using a predetermined communication protocol, the method for control of an apparatus including the following steps, having the server prepare by a frame structure a higher page forming a burial origin for a page of a desired layout of the browser programmed by a predetermined programming language, having the server set a dummy frame page of a region zero not containing content in the frame, having the server set a desired page having a means for generating a control request of the apparatus to be displayed in a remaining region other than the dummy frame page, having the server set a frame line so as not to be displayed, having the server set a response frame for responding to the request from the browser and updating the frame in the dummy frame, and having the browser display processing results from the server generated based on instructions from the browser corresponding to the request.

According to an eighth aspect of the present invention, there is provided a system for control of an apparatus in which a browser and server are connected through a network, the server is carried in an apparatus controlled by an instruction from the browser, and the operation of the apparatus in which the server is carried is controlled based on an instruction from the browser displayed on a display screen and/or a report made to the browser relating to a state of the apparatus between the browser and the server through a network using a predetermined communication protocol, the system for control of an apparatus characterized in that the server (a) prepares by a frame structure a higher page forming a burial origin for a page of a desired layout of the browser programmed by a predetermined programming language, (b) sets a dummy frame page of a region zero not containing content in the frame, (c) sets a desired page having a means for generating a control request of the apparatus to be displayed in a remaining region other than the dummy frame page, (d) sets a frame line so as not to be displayed, and (e) sets a response frame for responding to the request from the browser and updating the frame in the dummy frame, and the browser displays processing results from the server generated based on instructions from the browser corresponding to the request.

According to a ninth aspect of the present invention, there is provided a method for control of an apparatus which controls an apparatus using a server, carried in the apparatus, which controls the operation of an apparatus based on an instruction from a browser displayed on a display screen and/or reports to the browser relating to the state of the apparatus through a network using a predetermined communication protocol, the method for control of an apparatus including the following steps, having the server divide by a frame structure a page of a desired layout programmed by a predetermined programming language so as to surround only a portion requiring updating in the server, having the server set a frame line so as not to be displayed, having the server set frame positions and files of a predetermined text language displayed by the frames to give a desired layout, having the server standardize the background color of the page in a frame requiring updating of the display due to a response with a surface most color, having the server set a response frame for responding to a request from the browser and updating a frame only for frames requiring re-drawing due to a response, and having the browser display processing results from the server generated based on instructions from the browser corresponding to the request.

According to a 10th aspect of the present invention, there is provided a system for control of an apparatus which controls an apparatus using a server, carried in the apparatus, which controls the operation of an apparatus based on an instruction from a browser displayed on a display screen and/or reports to the browser relating to the state of the apparatus through a network using a predetermined communication protocol, the system for control of an apparatus characterized in that the server (a) divides by a frame structure a page of a desired layout programmed by a predetermined programming language so as to surround only a portion requiring updating in the server, (b) sets a frame line so as not to be displayed, (c) sets frame positions and files of a predetermined text language displayed by the frames to give a desired layout, (d) standardizes the background color of the page in a frame requiring updating of the display due to a response with a surface most color, and (e) sets a response frame for responding to a request from the browser and updating a frame only for frames requiring re-drawing due to a response and the browser displays processing results from the server generated based on instructions from the browser corresponding to the request.

BRIEF DESCRIPTION OF THE DRAWINGS

The above features and object of the present invention and other features and objects will become clearer from the following explanation given with reference to the attached drawings.

FIG. 9 is a view illustrating an HTML (HyperText Markup Language) comprising the screen illustrated in FIG. 7.

FIG. 14 is a view illustrating a method of dividing the frame of the screen of a browser in the second embodiment.

BEST MODE FOR CARRYING OUT THE INVENTION

According to the thinking of the inventors of the present application, it was learned that the problem to be solved by the invention of the present application may be roughly classified to two situations.

The first classification is the case where the redrawn screen at the time of re-drawing is completely the same as the image before the re-drawing, while the second classification is the case where the re-drawn screen is different from the previous one conversely to the first classification. According to these classifications, the situation and the processing thereof (correspondence processing) are different, so the description will be given separating them.

In the first classification, that is, the case where the image in the case of re-drawing is no different from that before the re-drawing, usually the re-drawing can be prevented by setting an HTTP status code of the response to 204 "No Content" at the server side.

The "status code" means the status described in the first row of a response message which the Web server sends back and describes how the server processed the request message therein.

When "OK" of the status code 200 indicating the case of success by the normal processing is returned and the browser receives this, the screen is re-drawn.

In order to employ this technique, it is necessary to change the settings at the server side and the CGI or ISAPI program and sets the status code of the response message to 204 for only screens not to be re-drawn. Accordingly, the inventors of the present application devised a method for dealing with such cases just by changing the HTML programming without changing the settings.

The second classification, that is, the case where the image to be displayed is different before and after the re-drawing, cannot be handled by just changing the settings of the HTTP status code etc. In this case as well, the inventors of the present application devised a method for reducing the visual obstacle by just changing the method of HTML programming according to the present invention.

Below, a method for the case where the screen does not change before and after the re-drawing due to a request message from the browser will be explained in detail at first, then a method of a case where the screen changes will be explained in detail.

First Embodiment

First Classification 1, Case Where There is No Screen Change

As a first embodiment of the present invention, the configuration illustrated in FIG. 6 and the browser screen illustrated in FIG. 7 will be given as examples. The case of no change in the screen will be explained.

Figure 1:
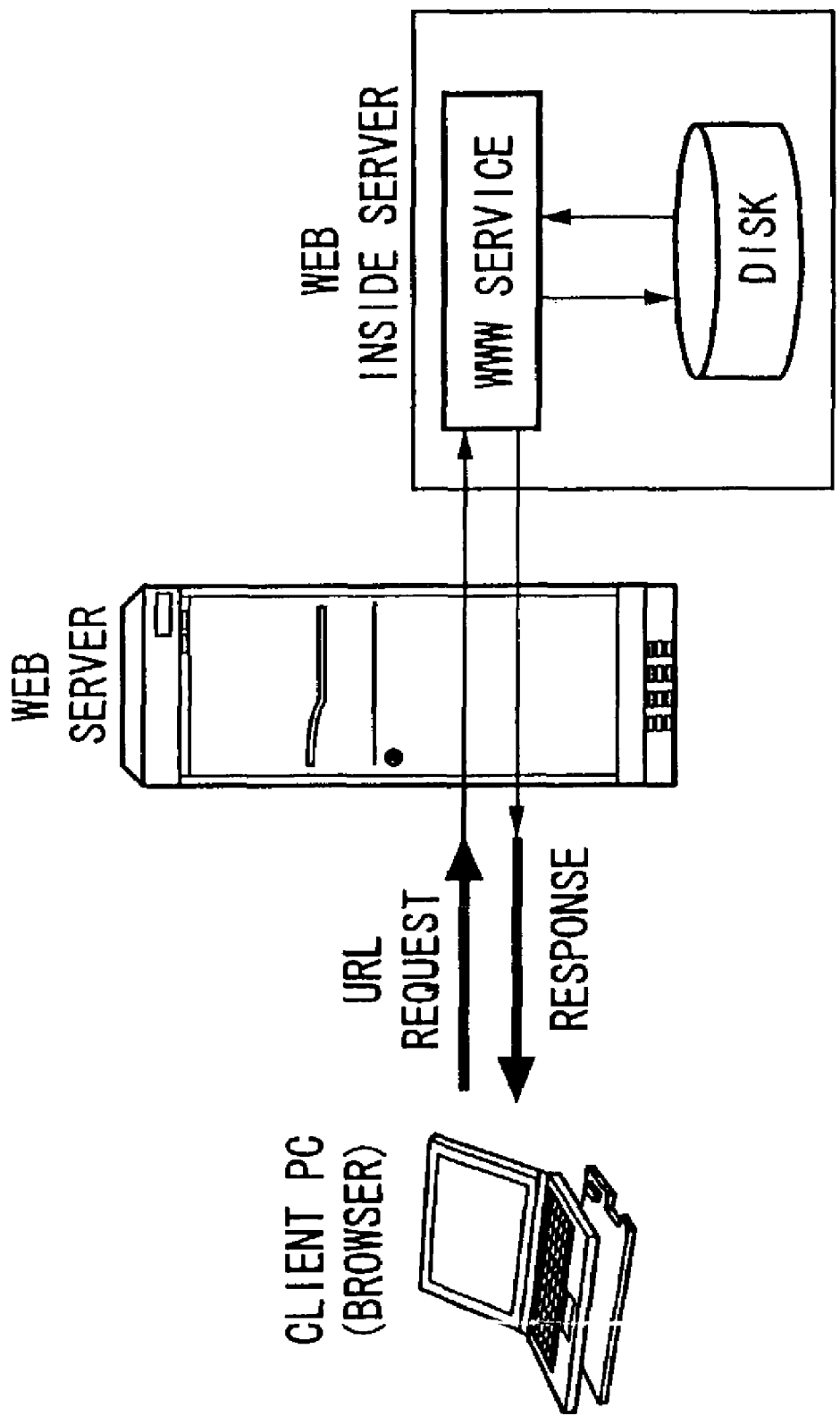
FIG. 1 is a view illustrating the flow of processing when accessing a Web page programmed by just HTML placed inside a server from a browser of a client personal computer (PC).
Figure 2:
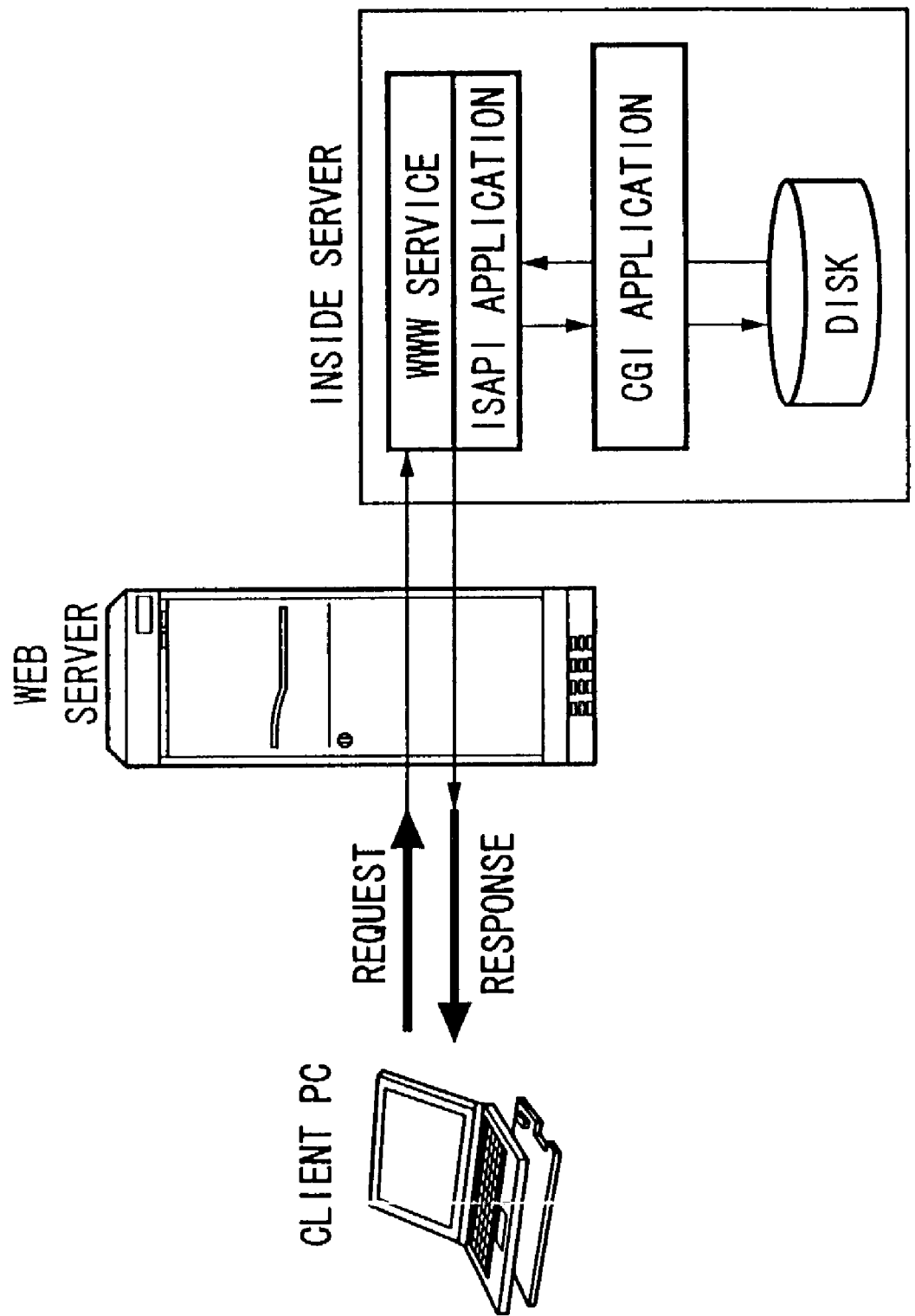
FIG. 2 is a view illustrating the flow of processing when accessing a Web page containing a CGI or ISAPI application.
Figure 3:
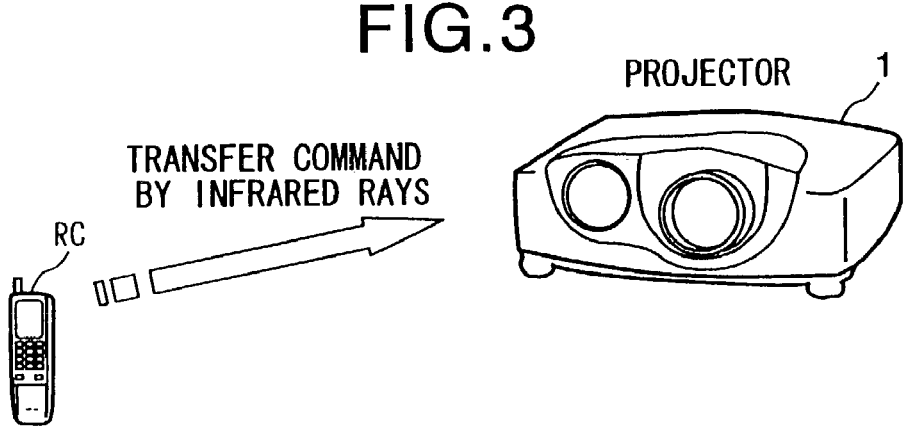
FIG. 3 is a view of an outline of a remote control system when using a projector as an apparatus to be controlled by a remote controller explained above.
Figure 4:
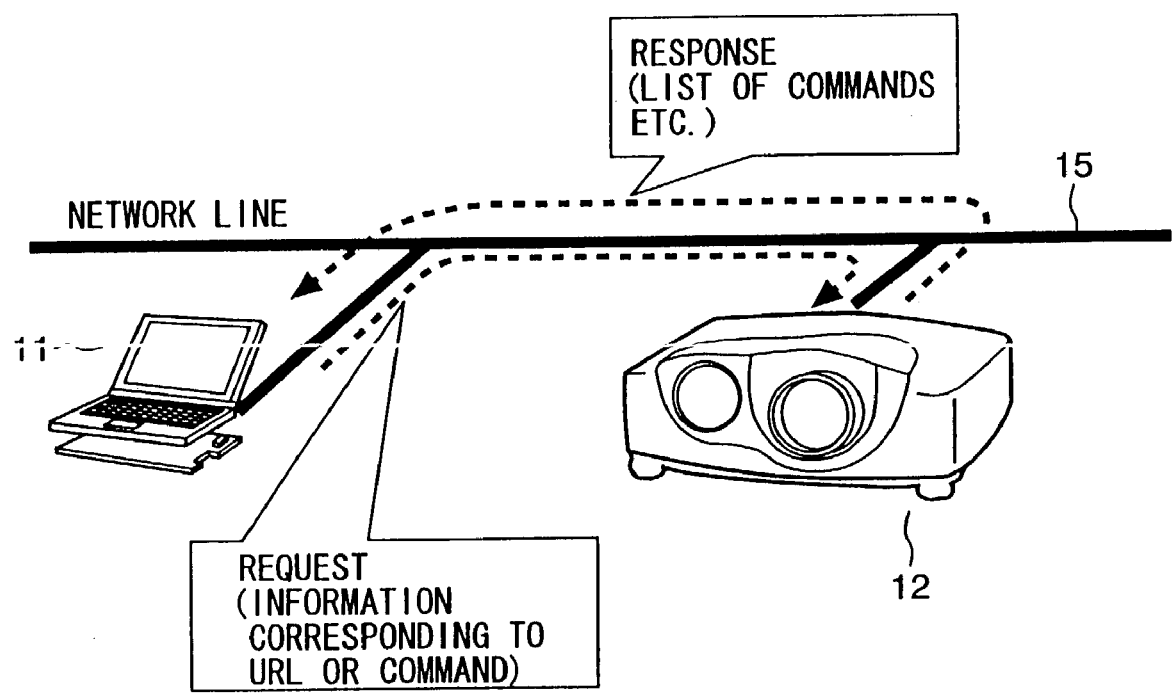
FIG. 4 is a view of the configuration where a projector and client PC (browser) are connected via a network.

As the first embodiment of the present invention, the case of remote control of the operation of a projector from a browser in the case of using the network system explained by referring to FIG. 4, that is, using a client personal computer (PC) as a browser and a projector having a built-in personal computer as an apparatus, where the browser and the projector are connected by a network line.

Namely, the system for control of an apparatus and the method for control of an apparatus of a first embodiment of the present invention use for example the projector 12 explained illustrated in FIG. 4 as the apparatus. As explained above, FIG. 4 is a view of the configuration wherein the projector 12 and the client PC (browser) 11 are connected via a network 15.

The client PC 11 carries the browser function, while the projector 12 carries the Web server function.

Figure 5:
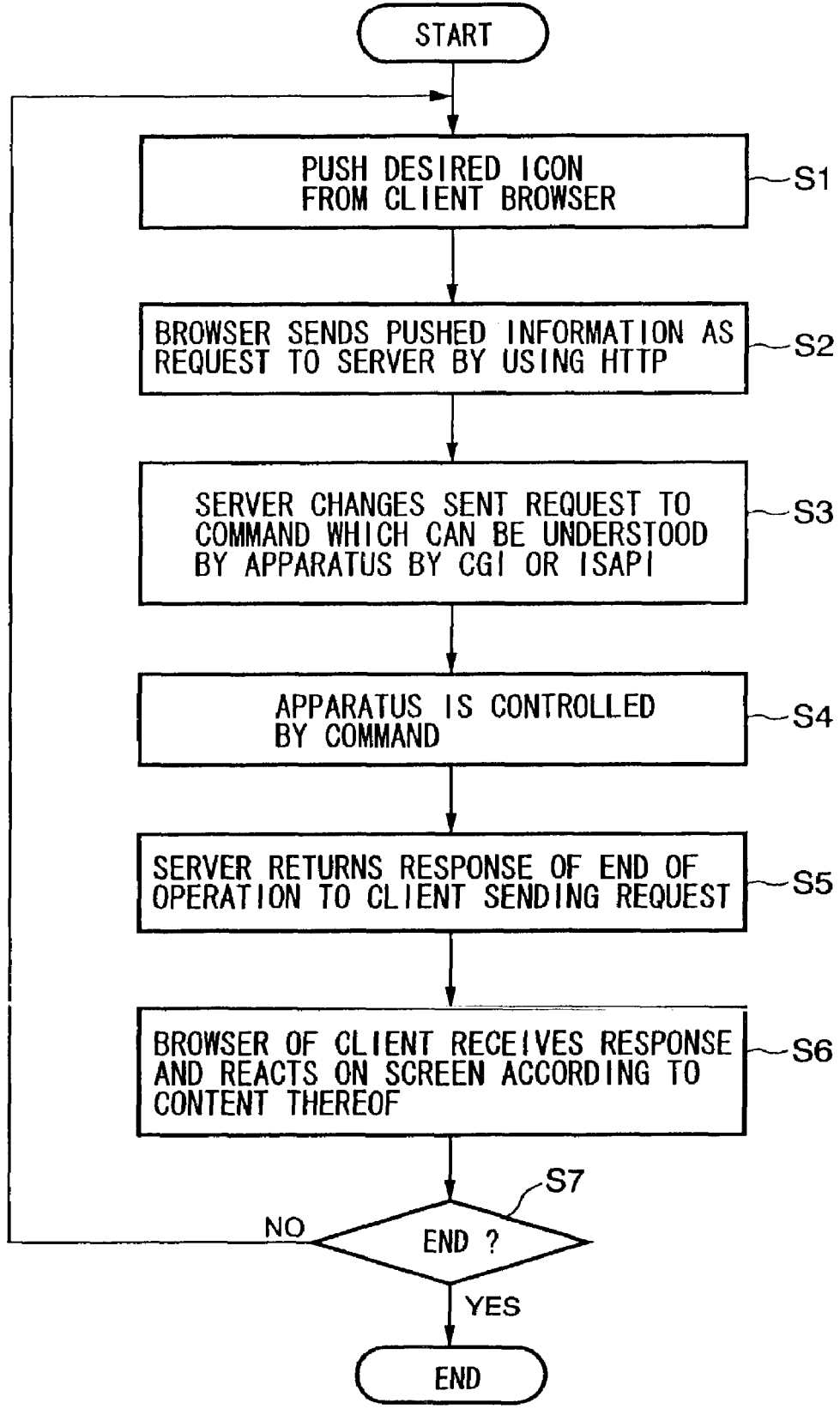
FIG. 5 is a flow chart of the processing in FIG. 4.

The projector 12 has built into it, other than the personal computer having the Web server function, a liquid crystal display (liquid crystal panel), polarizing means, etc. Further, the projector 12 uses its personal computer for the server or uses a built-in second personal computer for video display or video processing apparatus to directly receive and process the video information from a personal computer outside of the projector 12 and thereby enable an image to be projected by color. The basics of the processing of the Web server is as explained by referring to FIG. 5.

Note that the system of the present embodiment illustrated in FIG. 4 has a simple configuration of the projector 12 having the Web server and the client PC (browser) 11 connected via the network 15.

Figure 6:
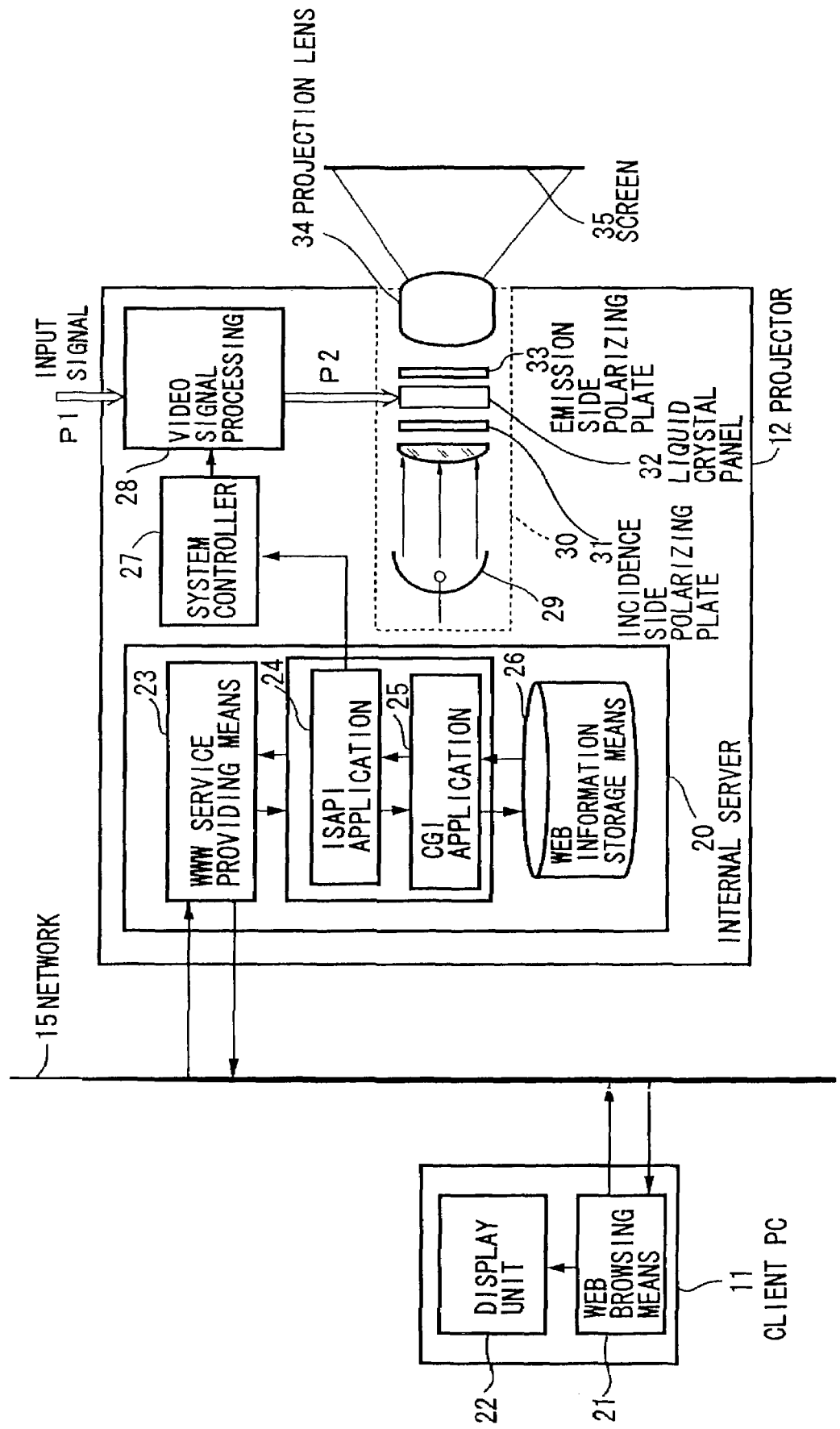
FIG. 6 is a view showing the configuration shown in FIG. 4 as a block diagram.

FIG. 6 illustrates the configuration shown in FIG. 4 as a block diagram. In FIG. 6, the client PC 11 is comprised of the functions of a Web browsing means 21, display unit 22, and not shown mouse or other selecting means (pointing device). The Web browsing means 21 accesses the Web server and performs processing for forming and displaying the screen based on the sent data. The browser function is realized by an application operating on a client PC 11 comprised of a hard disk or semiconductor memory or other storage means and a CPU (central processing unit). The display unit 22 displays the data processed by the Web browsing means 21 on a screen.

The projector 12 is comprised of an internal server 20, a control signal generator 27, a video signal processor 28, and an image projector 30.

The internal server 20 is comprised of a CGI application 25 called up and executed by a request from a Web browser, a WWW service providing means 23 making a response to the Web browser corresponding to a request and including processing results of an ISAPI application 24, and a Web information storage means 26 for storing screen information to be displayed on the Web browser.

Further, the internal server 20 responds to a request from the client PC 11 and returns the data required to the client PC 11 and generates a command for control of the projector 12 by the ISAPI application 24 which it outputs to a system controller 27.

The system controller 27 controls the system of the projector 12 based on a command output from the internal server 20. The control includes control signals not only for turning the power on and off, but also switching of input signals of video displayed by the projector 12 and adjustment of the video such as brightness, contrast, etc.

The video signal processor 28 performs video signal processing such as conversion of the number of pixels and D/A conversion for display on a liquid crystal panel 32 for a video input signal P1 input from an outside personal computer and adjusts the level of the display signal based on a control signal supplied from the control signal generator 27. The processed signal is output to the panel 32 as a drive signal P2.

The image projector 30 is comprised of a light source 29, an incidence side polarizing plate 31 and liquid crystal panel 32, an emission side polarizing plate 33, and a projection lens 34 and projects an image based on the drive signal P2. Explaining this in more detail, the light emitted from the light source 29 passes through the incidence side polarizing plate 31 in a predetermined polarization direction and strikes the liquid crystal panel 32. The emission side polarizing plate 33 detects the light of the predetermined polarization direction in the light output from the liquid crystal panel 32, outputs the video light in accordance with the drive signal P2 to the projection lens 34, and projects the image on the screen 35.

Figure 7:
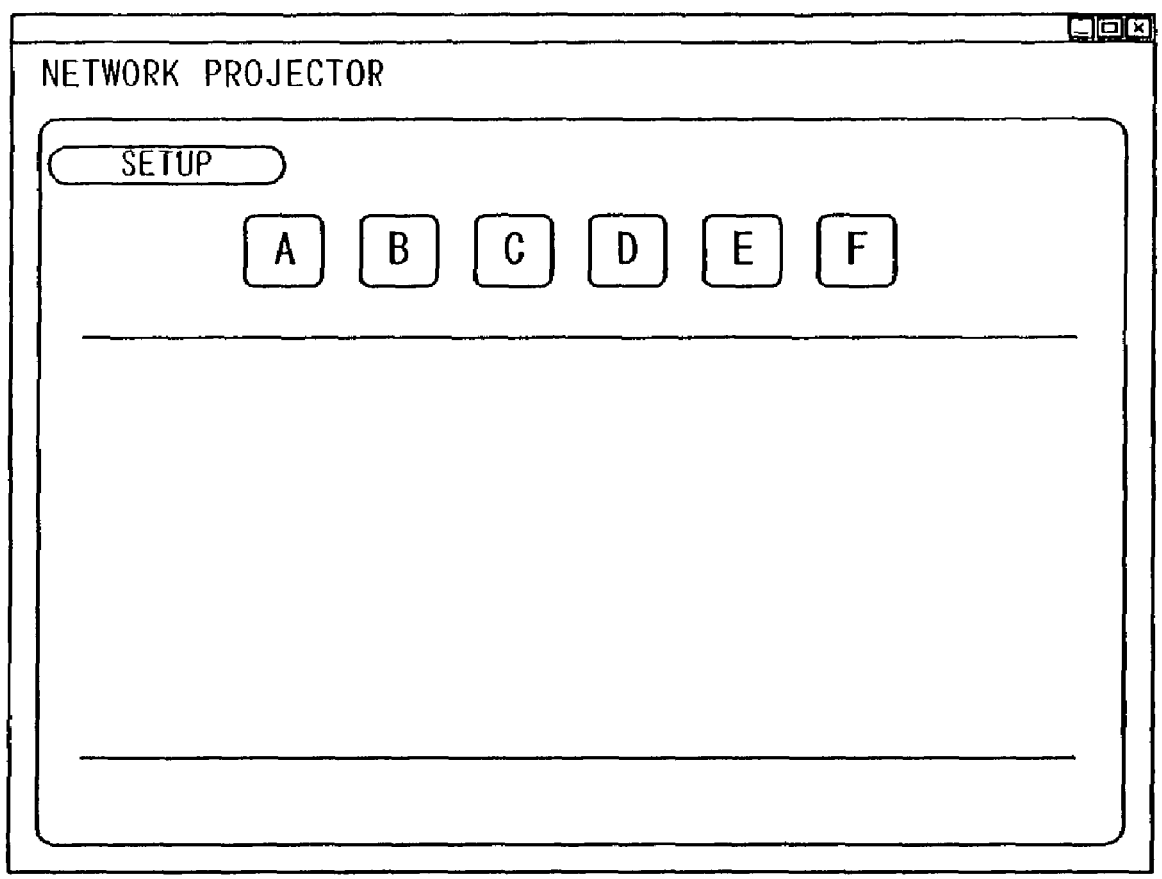
FIG. 7 is a view of an example of a display screen of a browser of a client PC of FIG. 4 in the case where there is no change in the screen at the time of redrawing on the browser as an example of a first embodiment of the present invention.

FIG. 7 is a view of an example of the display screen of the browser of the client PC of FIG. 4 as an example of the first embodiment.

Note that the browser itself is inherently software realized in a computer, for example, the client PC 11 of the present embodiment, but in the specification of the present invention, there are a case where the browser is handled as software processing content and a case where the browser is handled as a function realizing means.

Figure 8:
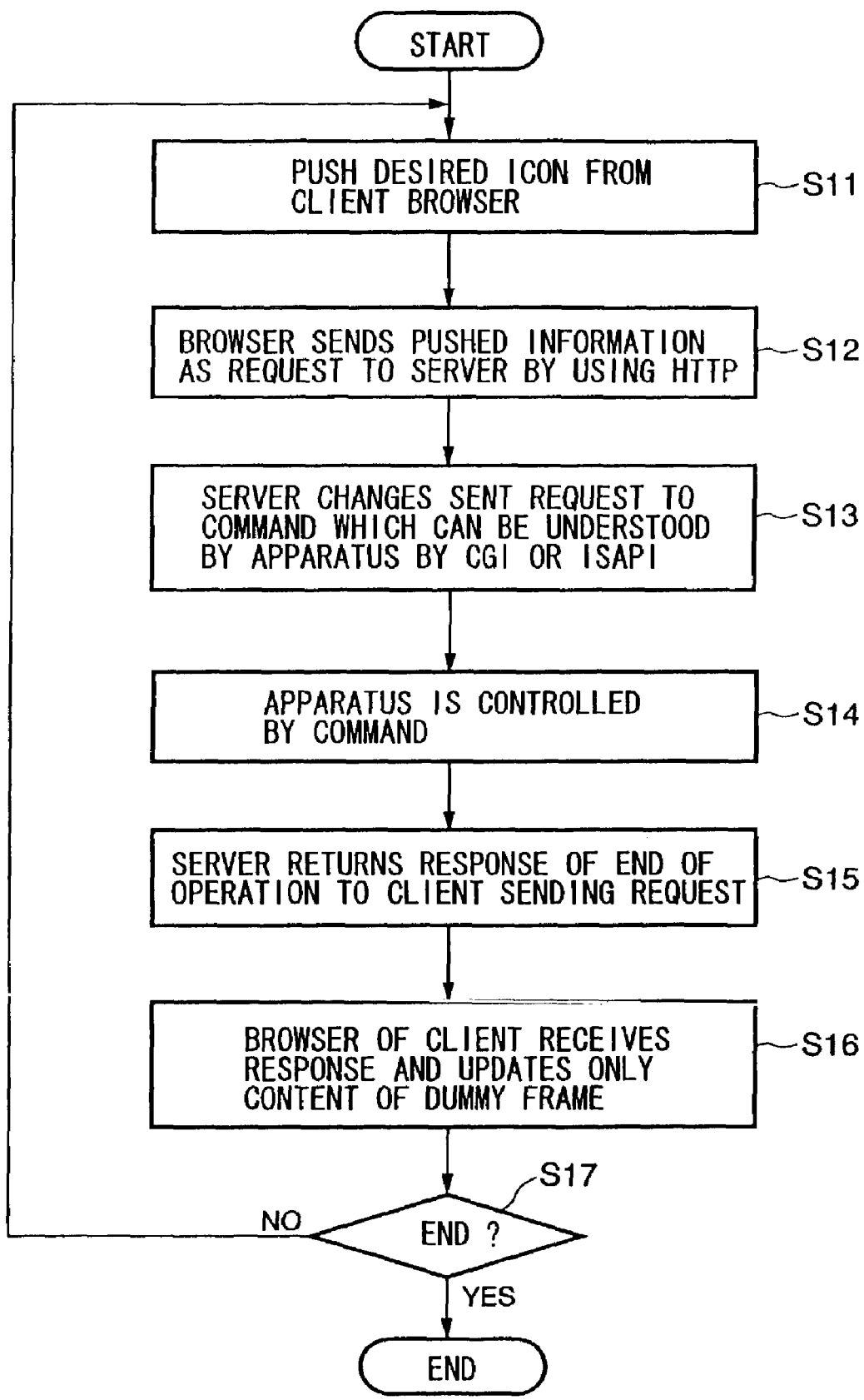
FIG. 8 is a flow chart of the operation and the flow of processing of the first embodiment.

FIG. 8 is a flow chart of the operation and the flow of the processing of the first embodiment.

FIG. 9 is a view illustrating the HTML (HyperText markup Language) comprising the screen illustrated in FIG. 7. Namely, FIG. 9 is a view of an example of HTML for controlling the projector of FIG. 4 on the screen illustrated in FIG. 7.

Figure 10:
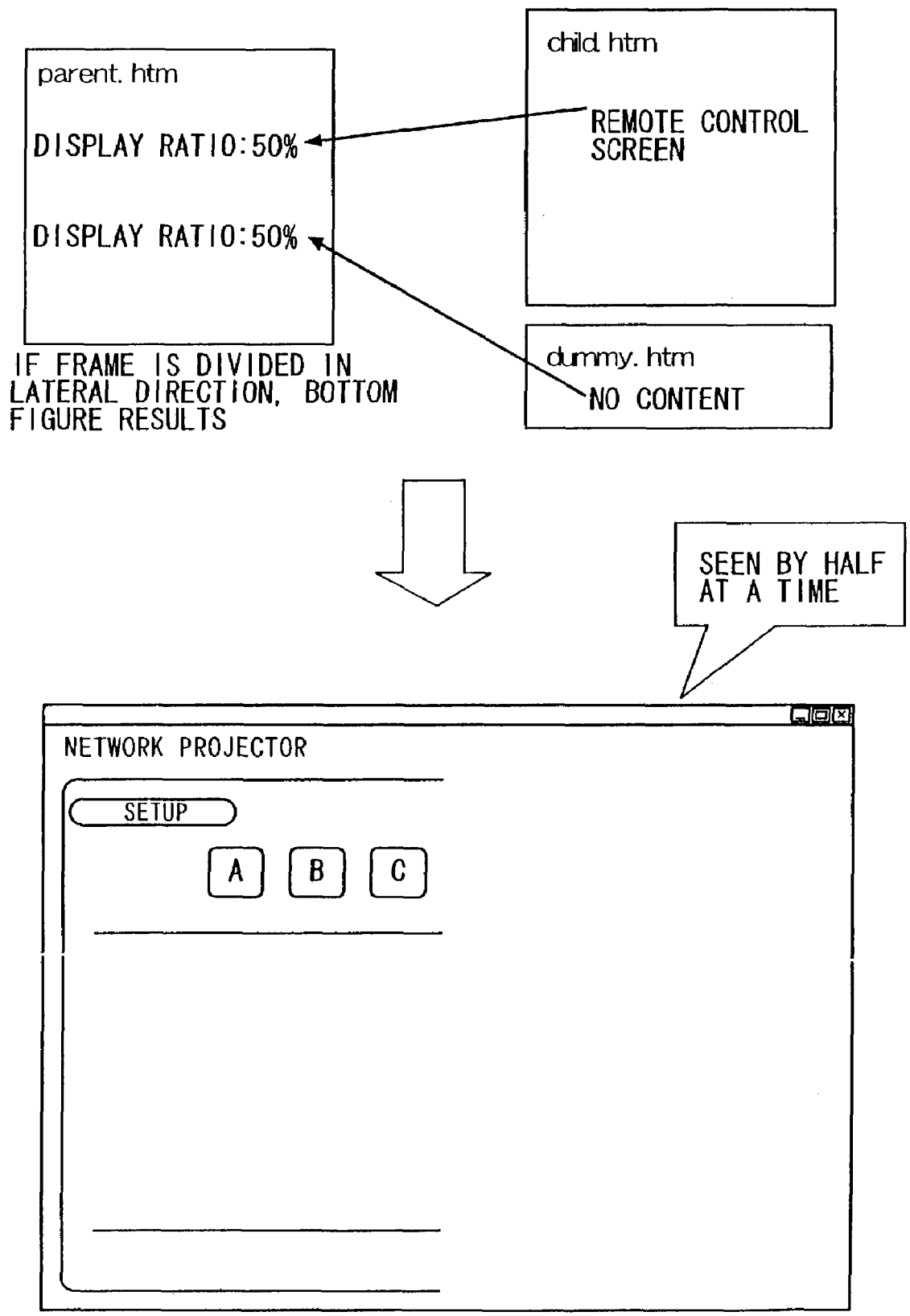
FIG. 10 is a view of the relationship between a Web page "child.htm" and a higher Web page "parent.htm" containing "child.htm" in the link destination.
Figure 11:
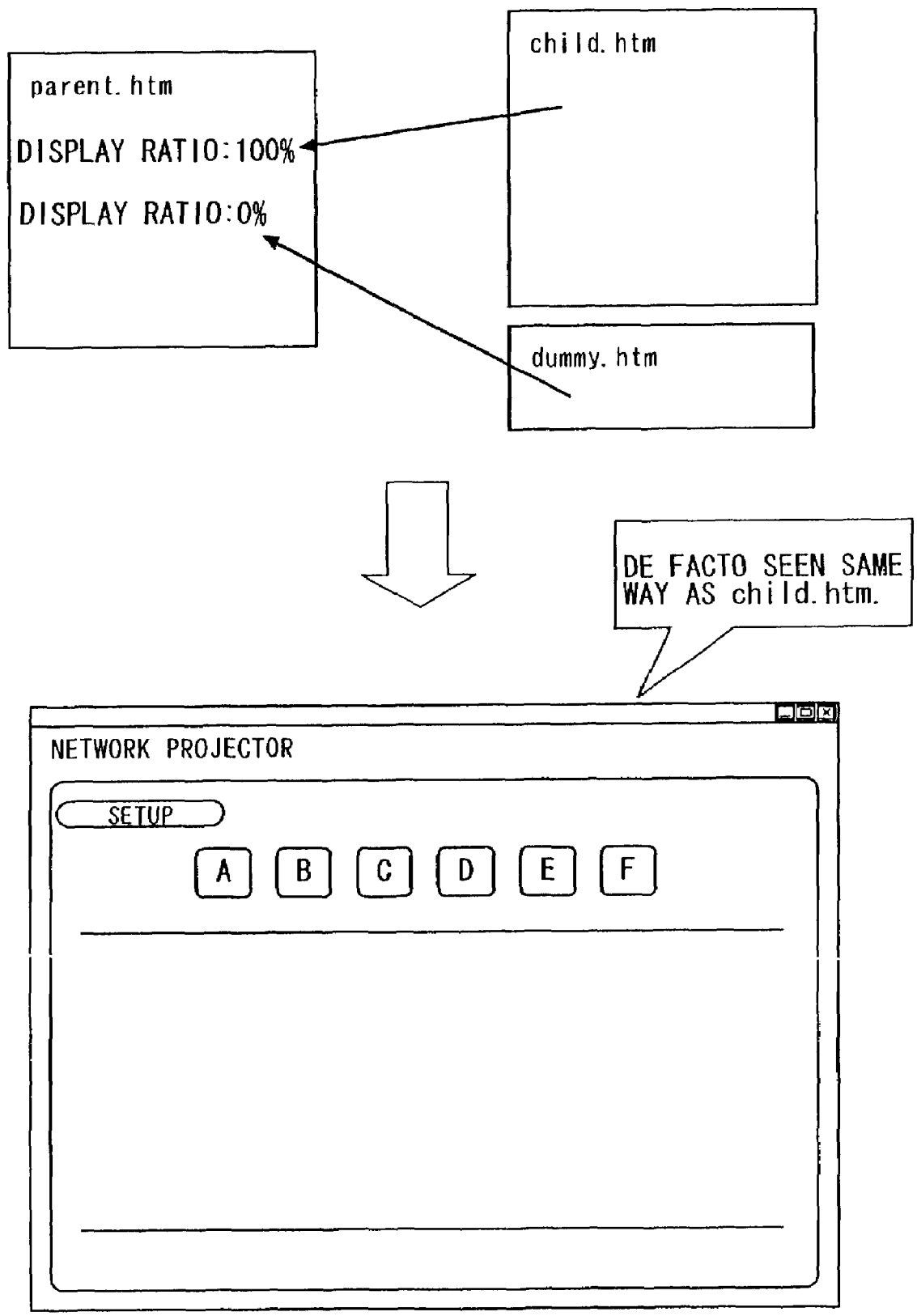
FIG. 11 is a view of the relationship between a Web page "child.htm" and a higher Web page "parent.htm" containing "child.htm" in the link destination.

FIG. 10 and FIG. 11 are views showing the relationship of the Web page "child.htm" and a higher Web page "parent.htm" containing "child.htm" as the link destination.

The browser screen shown in FIG. 7 is a screen displaying switches from A to F like the operation part of a remote controller.

The first embodiment of the present invention assumes a case where, when clicking any of icons from A to F from the top of the browser (FIG. 8, step 11), a command allocated to each is generated (FIG. 8, step 12, step 13), and the apparatus (projector of FIG. 4) is controlled (FIG. 8, step 14).

An example of the preparation of the HTML (HyperText Markup Language) comprising the screen illustrated in FIG. 7, that is, the HTML for controlling the projector of FIG. 4 on the screen illustrated in FIG. 7 will be described by referring to FIG. 9.

HTML Preparation Routine 1: As the HTML describing the HTML (HyperText Markup Language) comprising the screen illustrated in FIG. 7, an HTML describing the link position for the arrangement of images etc. by a technique similar to the past is prepared.

In the example of FIG. 9, the mechanism transfers the data to the server application by using the ISAPI. Of course, it is also possible to use the CGI in place of the ISAPI (FIG. 8, step 13).

In the prior art, a page capable of controlling the apparatus, that is, the projector illustrated in FIG. 4 in the present embodiment, by only this HTML page is completed.

HTML Preparation Routine 2: In the embodiment of the present invention, next, when defining the Web page prepared by the routine 1 as "child.htm", the higher Web page including "child.htm" as the link destination is newly prepared. If naming this higher page as "parent.htm", a frame structure is formed inside "parent.htm".

This frame is structured burying "child.htm", the dummy use Web page "dummy.htm", and the "child.htm" prepared by routine 1. At this time, "dummy.htm" is a page not containing anything in terms of content. As shown by the relationship illustrated in FIG. 11, a frame name representing "child.htm" is named as "CHILD" and a frame name representing "dummy.htm" is named as "DUMMY" in the frame settings in "parent.htm".

The frame of the frame structure may be divided either in the vertical direction or horizontal direction. The ratio of division is set as illustrated in FIG. 11 so that "child.htm" is 100% or * (meaning all) and "dummy.htm" is 0% or 0 (meaning nothing). Note that the system is set so there are no border lines of frames.

An example of the ratio in the case of using a frame structure is shown in FIG. 10. In the frame structure, by giving a frame comprising the screen, the layout can be freely set. In the example illustrated in FIG. 10, a frame structure is used wherein the frame is divided 50% each in the lateral direction, that is, divided to right and left at the center of the screen. The interior of the frame shows "child.htm" on the left and shows "dummy.htm" on the left.

HTML Preparation Routine 3: If clicking on the portion for generating a request of a command described in "child.htm", that is, the mouse (FIG. 8, step 11), the target frame is set to "DUMMY" in the portion calling up the ISAPI application (FIG. 8, step 13).

In the grammar of HTML for displaying a link destination by clicking on the mouse, by designating the target frame, the location displayed by the link destination can be designated as a frame designated as the target frame. Here, the response message returning from the server corresponds to the link destination information.

By the above setting, the response returning from the ISAPI application through the Web server (FIG. 8, step 15) re-draws only the target frame. At this time, the target frame "DUMMY" is the setting in the HTML preparation routine 2 and prepared so that there is no space, so it appears that no re-drawing is carried out.

In the conventional method, when there is no change in the screen due to the response, when transmitting a request to a server installed in the apparatus to be controlled (projector of FIG. 4) using the browser at the client side (FIG. 4, browser of client PC), there was the problem that the re-drawing of the screen due to the response covered the entire browser screen and made the screen appear to flash and thereby create a visual obstacle, but the first embodiment of the present invention solves this problem. That is, according to the first embodiment of the present invention, when there is no need to update the screen of the browser at all, it is possible to prevent the occurrence of the problem of flashing etc. without changing the settings of the server and just changing the method of programming of the HTML.

The portion generally expressed by one HTML file is realized by preparing a plurality of files using the frame structure in the present invention.

Second Embodiment

Case of Change in Screen

As a second embodiment of the present invention, the case where there is a change in the screen will be explained taking as an example the browser screen illustrated in FIG. 12.

As the second embodiment of the present invention, similar to the first embodiment, the case of remote control of the operation of a projector from a browser in the case of the network system explained by referring to FIG. 4 and FIG. 6, that is, using a client PC as a browser, using a projector having a built-in personal computer as the apparatus, and connecting the browser and projector by a network line, will be exemplified.

Figure 12:
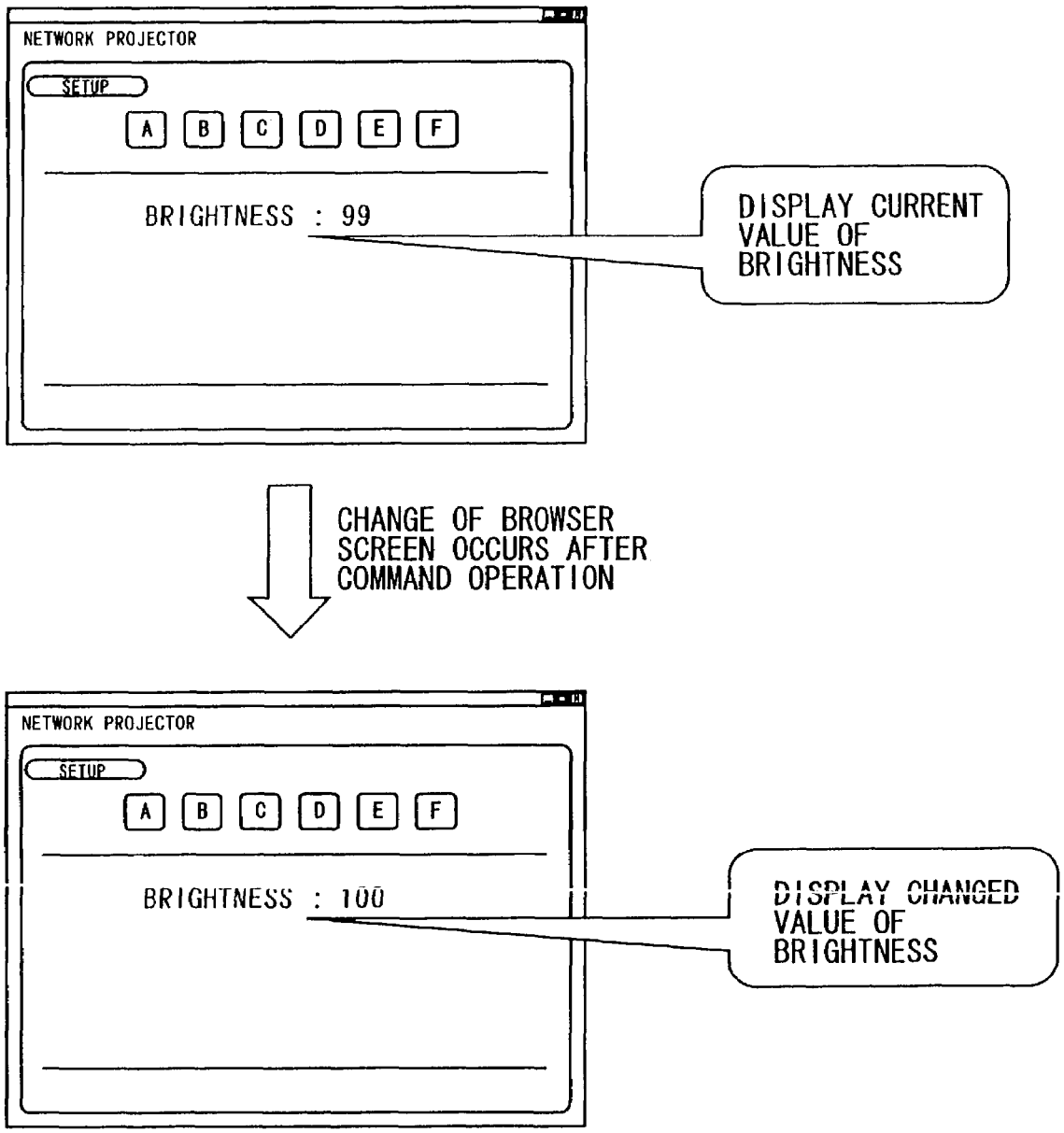
FIG. 12 is a view of an example of the display screen of the browser of the client PC of FIG. 4 in the case of a screen change at the time of re-drawing in the browser as an example of a second embodiment of the present invention.

FIG. 12 is a view of an example of the display screen of a browser of the client PC of FIG. 4 as an example of the second embodiment of the present invention. FIG. 12 shows an example of the screen in the case of a change in the screen before and after the redrawing.

Figure 13:
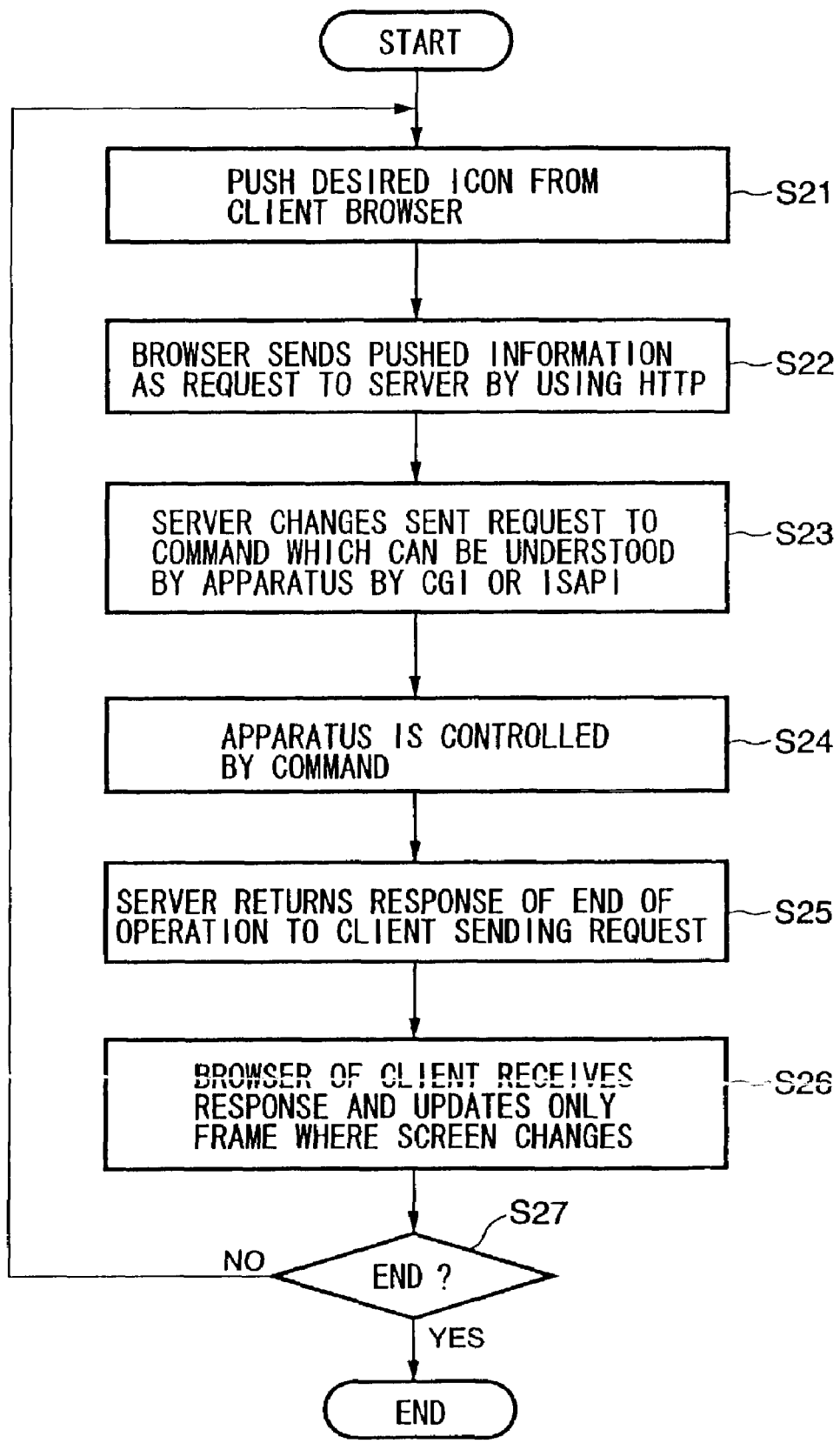
FIG. 13 is a flow chart of the operation and flow of processing in the second embodiment.

FIG. 13 is a flow chart showing the operation and the flow of the processing of the second embodiment of the present invention.

FIG. 14 is a view illustrating a method of dividing the frame of the screen of the browser in the second embodiment of the present invention.

Figure 15:
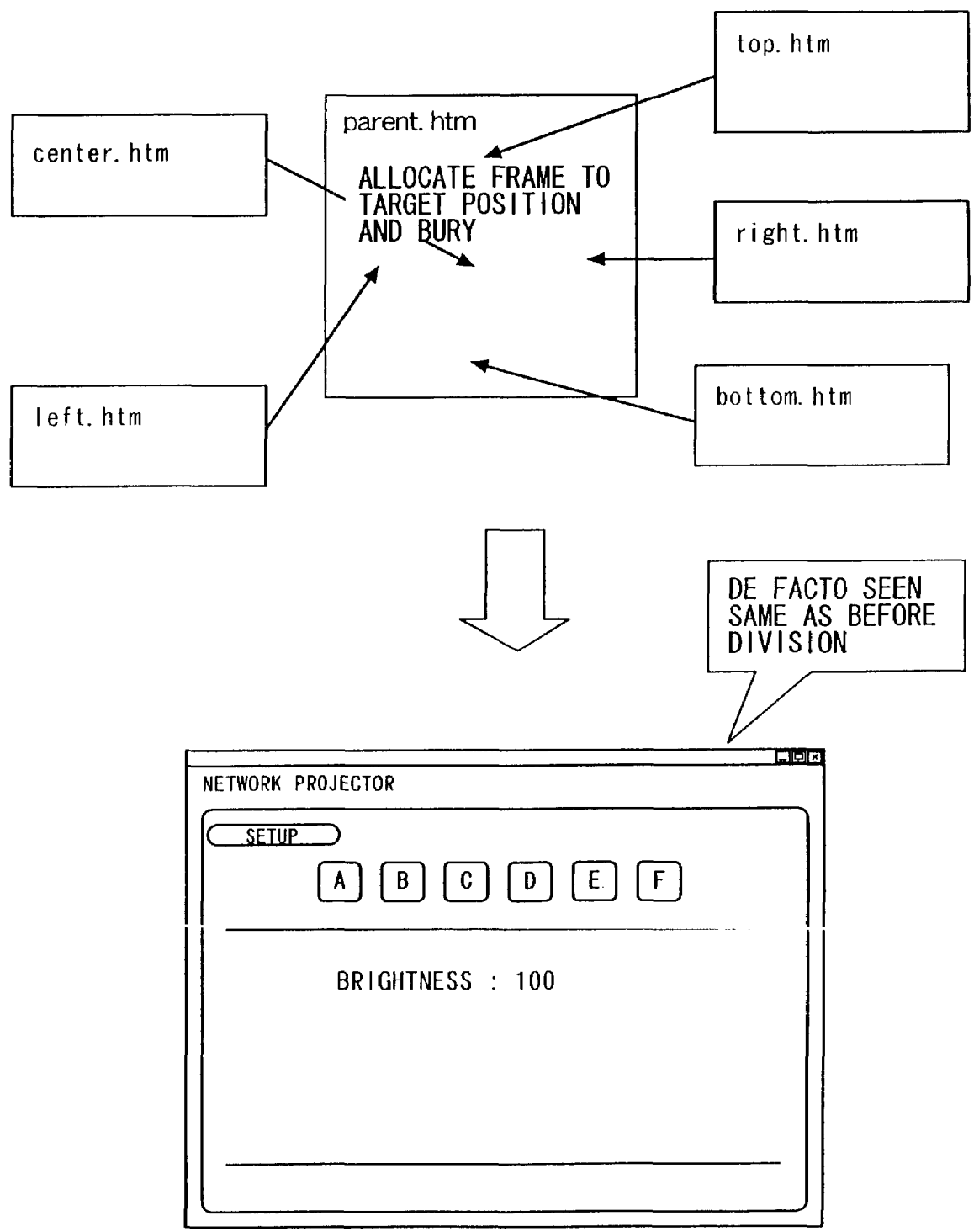
FIG. 15 is a view illustrating positional relationships of frames of the Web page in the second embodiment of the present invention.

FIG. 15 is a view illustrating the positional relationship of frames of the Web page in the second embodiment.

First, in the state before the browser (FIG. 4, client PC) issues a request for a command, the browser screen shows the value of brightness of the setting information of the apparatus (FIG. 4, projector) as 99.

Next, by the operation of clicking the icon of the browser (FIG. 13, step 21), a command for raising the brightness value is requested to the server in the projector (FIG. 13, step 22).

A status value 100 of brightness is returned by the response after the server in the projector performs that command processing. Below, the explanation will be made taking the example where 100 is displayed as the value of brightness on the browser screen after the re-drawing.

Processing 1: First, the user selects the region changing before and after the response for the desired browser screen. In this case, the portion of "Brightness: 100", at the center of the screen illustrated in FIG. 12 is selected considering also a case where also the displayed word "Brightness" changes.

Processing 2: The HTML file is described by dividing one browser screen to five parts so as to cut out the portion divided by operation 1 and surround the same by a peripheral portion. That is, as shown in FIG. 14, originally one Web page is divided into five Web pages so as to surround the changing portion. At this time, the page of the uppermost portion of each is defined as "top.htm", the lowermost portion is defined as "bottom.htm", the right portion is defined as "right.htm", the left portion is defined as "left.htm", and the portion where the change occurs is defined as "center.htm".

Processing 3: The page forming the higher page among the five Web pages divided in processing 2 is prepared. As illustrated in FIG. 15, the five pages are combined to form the frame structure to give the original single page. That is, if defining the page indicating the higher frame as "parent.htm", the "parent.htm" is programmed for division of the frame into five pages. The five pages are linked so as to correspond to the divided frames and make the five pages appear to be a single page. At this time, the frame corresponding to the portion where there is a change on the screen is named as "CENTER". Note that it is desirable to set the system so that the border lines of the five frames are not displayed.

Processing 4: Here, only for the page of "center.htm" of the changing portion on the screen, the color of the background (background color) is designated as the same color as the color of the front side of the page. That is, in this case, the color of the front side is white, so the color of the background is also designated to white. (In the other pages, i.e., the four pages at the top, bottom, left, and right thereof, the color of the background becomes gray and the color of the front side becomes white in this example).

Processing 5: Finally, when the portion for generating the request, that is, the icon portion existing in "top.htm" in this example, is clicked (FIG. 13, step 21), the request of the command is generated (FIG. 13, step 22) and the target frame is set as "CENTER" by the portion calling up the ISAPI application (FIG. 13, steps 23, 24).

Processing 6: The server in the projector returns the response to the browser (client PC (FIG. 13, step 25).

Processing 7: The browser receives the response and draws the result thereof (FIG. 13, step 26). From the above processing, the only re-drawing due to the response from the server in the browser becomes the "CENTER" portion having motion.

Processing 8: The above processing is repeated according to need (FIG. 13, step 27).

When a change of the screen is necessary due to a response, applying the second embodiment of the present invention can similarly reduce the visual obstacle of the flashing. In this case, the visual obstacle can also be reduced by the amount of the smaller re-drawing region in comparison with the case where the whole screen is redrawn. Also, originally the flashing is a problem where the time difference of the drawing order of the background color and the surface color is sensed and appears like flashing, but in the present embodiment, the colors of the background color and the surface color are standardized for the portion to be re-drawn as well. This is very effective so long as the displayed object (color and size of the text etc.) does not change much.

Modification of Second Embodiment

In the second embodiment, when the content of the display of the browser screen changes due to a response, one location was changed in the example, but if increasing the number of divisions, it is possible to handle cases of changes in a plurality of locations. In this case, it is possible to similarly handle such a case by arranging non-changing frames so as to surround the changing frame.

Other Modifications

In the above embodiment of the present invention, the explanation was given of the case of using HTTP (HyperText Transfer Protocol) as an example of the communication protocol and using HTML (HyperText Markup Language) as an example of the programming language, but the transmission protocol and text language are not limited to the above illustration.

In the first embodiment and second embodiment of the present invention, the example where the server function was provided inside the apparatus (projector of FIG. 4) was explained, but in such a case, it is possible to control a plurality of apparatuses, for example, a plurality of projectors of FIG. 4 by one server. In such a case, a plurality of apparatuses can be controlled by one server and, in addition, an improvement of the response with respect to these requests can be achieved.

In the above embodiments of the present invention, the projector illustrated in FIG. 4 was exemplified as the apparatus to be controlled, but the apparatus to be controlled in the present invention is not limited to a projector. For example, as the apparatus to be controlled, air-conditioners, television receivers, and various other apparatuses including built-in computers can be mentioned.

Further, in the present embodiments, HTML was used as the language for programming the Web page, but the language is not limited to the HTML and can be any programming language of a Web page such as XML (Extensible Markup Language) expanding the functions of HTML by making the structure of the document a document type definition file called a DTD (Document Type Definition). Further, the communication protocol is not limited to HTTP. The present invention can be widely applied to any communication protocol used on the Internet.

In the present invention, the apparatus to be controlled can cover all apparatuses connected to a network. That is, if there is a home server or the like, the present invention can be applied to the case where all household electrical appliances to be controlled by the home server are controlled.

Note that, in the broadband network era, even under an Internet environment where an instantaneous reaction of a response is not that much of a concern at present, if the time for obtaining the information after the request becomes instantaneous, there is a possibility that these visual obstacles will become a problem. The present invention can be applied to such a case as well.

According to the present invention, the problem that, when there is no change in the screen due to a response and when transmitting a request to a server installed in an apparatus to be controlled by using a browser at the client side, if the screen is comprised by the prior art, the re-drawing of the screen by the response covers the entire browser screen and the screen appears to flash creating a visual obstacle is overcome. When it is not necessary to update the screen, the problem of flashing can be eliminated without changing the setting of the server and just changing the method of programming of the HTML.

Further, according to the present invention, when there is a change in the screen due to a response, the visual obstacle of flashing can be reduced. Particularly, according to the present invention, the visual obstacle can be reduced by the amount of the smaller re-drawing region in comparison with when the screen as a whole in the browser is re-drawn.

Preferably, the colors of the background color and the surface color for the portion to be re-drawn as well are standardized. This is very effective so far as the displayed object (color and size of text etc.) does not change much.

Further, according to the present invention, if the obstacle due to flashing is reduced, the response becomes faster at the portion where re-drawing is not necessary and the operability in control of the apparatus is improved. Further, by eliminating or reducing the update range, since the non-cached portion or information changes each time, the amount of the received information in the case of a setting not enabling caching can be reduced and in turn the response can be improved and the operability improved.

INDUSTRIAL APPLICABILITY

The present invention enables remote control of various types of apparatuses having server functions through a network (communication network).

The invention claimed is:

1. A method of preventing a browser from refreshing when receiving responses to commands sent to an apparatus being controlled by the browser via a network, said browser displaying a remote control for controlling the apparatus, the method comprising the steps of:

displaying on said browser a child frame containing the remote control and a dummy frame comprising substantially zero-percent of the browser, said child frame including an update frame containing a portion of the remote control that requires updating;

dividing the update frame into four rectangular frames to surround a changing frame of the update frame, said four rectangular frames forming the update frame when combined together, wherein each of the four frames abut the changing frame on a respective top side, left side, right side, and bottom side of the changing frame;

issuing a first command to the apparatus using the displayed remote control, said first command not changing the displayed remote control;

issuing a second command to the apparatus using the displayed remote control, said second command changing the portion of the remote control that required updating;

receiving a first response to said first command from said apparatus into said dummy frame, said first response re-drawing the dummy frame;

receiving a second response to said second command from said apparatus and updating only the update frame that contains the portion of the remote control that requires updating, wherein the entire child frame does not refresh, and only the changing frame of the update frame is refreshed; and standardizing background color of only the update frame to a surface color upon detection of a time difference between the first response and second response.

2. The method of claim 1, wherein the dummy frame, the update frame, and the child frame have border lines that are not displayed in the browser.

3. The method of claim 1, wherein the apparatus contains a server and is controlled based on commands received from the browser.

4. A system for preventing a computer display controlled by a browser from refreshing when receiving responses to commands sent to an apparatus being controlled by the browser via a network, said browser displaying a remote control for controlling the apparatus, the system comprising:

a display device controlled by the browser and configured to display a child frame containing the remote control and a dummy frame comprising substantially zero-percent of the browser, said child frame including an update frame containing a portion of the remote control that requires updating, wherein the update frame is divided into four rectangular frames to surround a changing frame of the update frame, said four rectangular frames forming the update frame when combined together, wherein each of the four frames abut the changing frame on a respective top side, left side, right side, and bottom side of the changing frame;

a first selection device configured to select commands to the apparatus using the displayed remote control, wherein selection of a first command does not change the displayed remote control, and wherein selection of a second command changes the portion of the remote control that required updating;

wherein the computer is configured to receive a first response to said first command from said apparatus into said dummy frame, said first response causing the browser to re-draw the dummy frame, and wherein the computer is configured to receive a second response to said second command from said apparatus and for updating only the update frame that contains the portion of the remote control that requires updating, wherein the entire child frame does not refresh, and only the changing frame of the update frame is refreshed; and means for standardizing background color of only the update frame to a surface color upon detection of a time difference between the first response and second response.

5. The system of claim 4, wherein the dummy frame, the update frame, and the child frame are controlled by the browser so that border lines of the frames are not displayed.

6. The system of claim 4, wherein the apparatus contains a server and is controlled based on commands received from the browser.

* * * * *